Patented Nov. 25, 1930

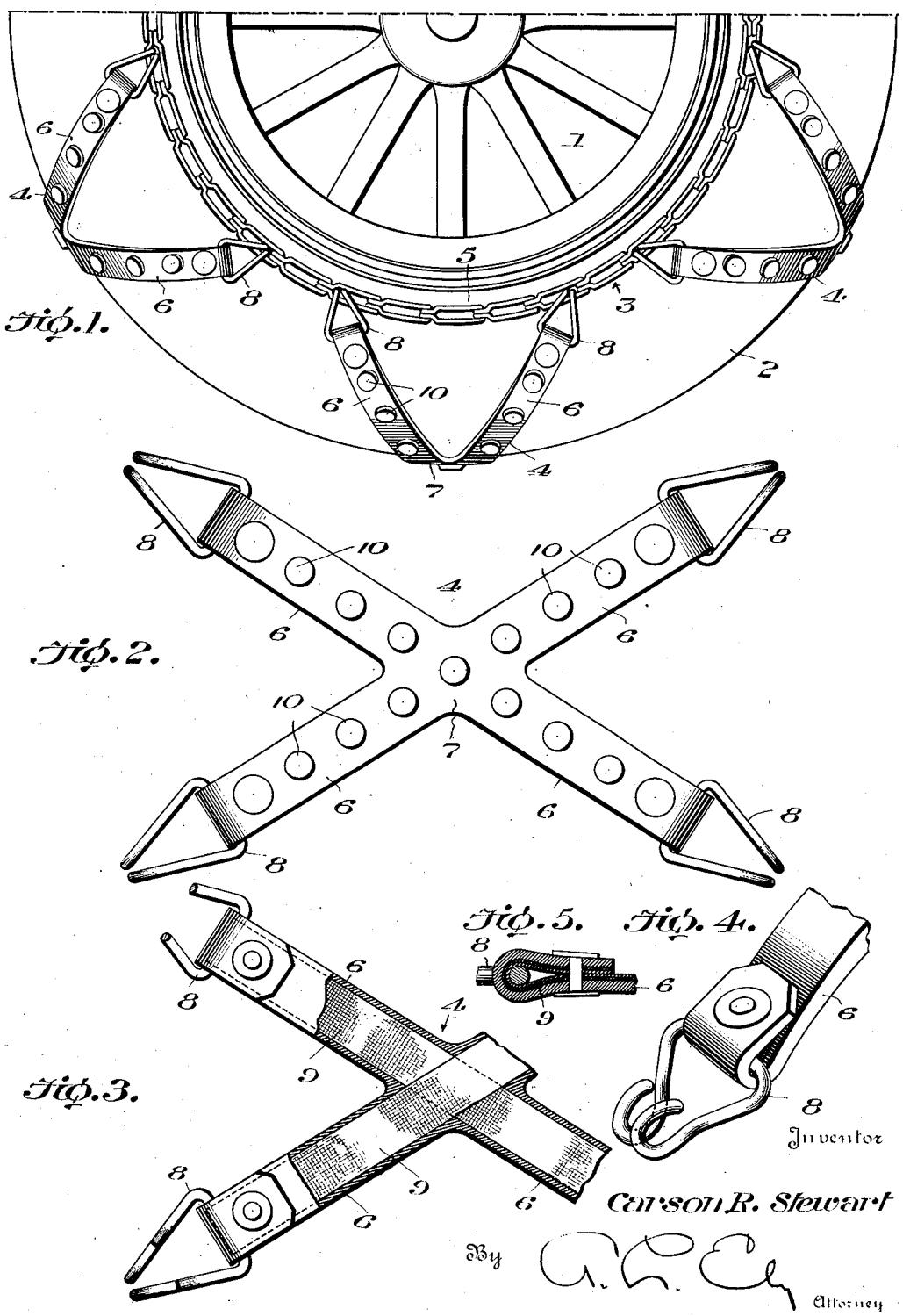

1,783,161

UNITED STATES PATENT OFFICE

CARSON R. STEWART, OF AKRON, OHIO, ASSIGNOR TO UNITED STATES CHAIN & FORGING COMPANY, OF PITTSBURGH, PENNSYLVANIA, A CORPORATION OF DELAWARE

TRACTION DEVICE FOR TIRES

Application filed June 5, 1922. Serial No. 565,898.

The present invention relates to improvements in armor devices for use upon automobile tires to prevent skidding, and racing of the wheel, and to obtain increased traction, particularly under unfavorable road conditions.

Broadly, the invention is designed as an improvement over the structure disclosed in my co-pending application, Serial No. 469,083, filed May 15, 1921, which has matured into Patent No. 1,449,456, granted March 27, 1923, some of the particular objects sought in the present instance being to improve upon the manner, and means, of attaching the devices to the tire, and to simplify their construction while, at the same time, increasing their strength and resistance to wear.

The invention is also directed toward providing improved means of distributing a plurality of my devices about the tire whereby they may be used in greater or lesser numbers as desired.

Other objects and advantages, such as an improved traction surface for the device, ease and security of application and relatively low cost of manufacture will appear as this description proceeds and is construed in the light of the drawing accompanying and forming a part of this specification.

In the drawing:

Figure 1 is a side elevation of one-half of a wheel and tire equipped with the devices of my invention;

Figure 2 is a plan view of one of the elements of the invention, drawn to an enlarged scale, as compared with the showing in Figure 1, and looking at the working face of the element;

Figure 3 is a fragmentary plan view looking at the reverse face of the element with a portion thereof broken away to show the interior construction;

Figure 4 is a detail perspective view of a portion of one of said elements; and

Figure 5 is a detail section through a portion of the element.

The invention will now be described in detail, reference being had to the drawing in which 1 designates a wheel, 2 a tire mounted thereon, and 3 a preferred form of armor constructed in accordance with my invention.

The armor, in the present instance, comprises a plurality of flexible resilient elements 4 adapted respectively to span the tread and the side walls of the tire and to be secured, upon each side of the tire, to common connecting elements, such as adjustable link chains, one of which is shown at 5. These chains 5 may be of any suitable construction and the ends of each chain may be connected together upon each side of the tire in any preferred manner.

Each element 4 preferably is constructed of flexible material, as will presently be described, and comprises a plurality of arms 6 radiating from a common center and arranged in cruciform or X-shape formation to provide an enlarged central portion 7. The portion 7 is adapted to lie centrally of the tread surface of the tire when the element is applied in operative position. The arms 6 are adapted at their terminal portions for attachment to the aforesaid chains 5, and each arm is of equal length whereby when attached, the portion 7 is centered relative to the tire and each arm is disposed in a diagonal position relative thereto. Any suitable form of connections may be provided between the terminals of the arms 6 and the chains 5. Preferably, however, the terminal portion of each arm is looped and riveted about an open link 8 of the character having spaced hooked ends which may be readily attached or detached to the chains either by hooking it through or over a link thereof.

The element 4 is composed of rubber or rubber composition of the degree of resiliency desired and is reinforced in the manner best shown in Figure 3. The reinforcement, in this instance, comprises fabric strips 9 that intersect at the center of the portion 7 and are coextensive in length with that of the arms 6. This form of reinforcement may be incorporated in the element 4 in any suitable manner and may comprise two single strips arranged in the crossed relation above indicated, or superposed strips may be utilized if desired. Preferably the strips 9 are of slightly less width than the arms 6 and are incorporated in the element 4 in such manner that they are remote from the ground engaging face of the element and slightly below the tire side of said element. This arrangement of the strips 9 provides for a more rigid reinforcement near the tire side of the element while, at the same time, a suitable cushioning surface is assured on the opposite side of the strips. Also, I prefer to cut the fabric strips so that the warp threads thereof are parallel with the arms 6 of the element and in this manner the rubber is prevented from stretching. It will appear from the foregoing that the elements 4 are yieldable under pressure against the ground, that is, radially of the tire, to provide effective tractive qualities, but are non-stretchable transversely of the tire so that they will not stretch and become loose and flop about the tire after they have been in use for a while.

Upon the working face of each element 4, a plurality of protuberances are provided, preferably in the form of buttons 10, to provide for additional traction and also to insure a better wearing surface thereon. These protuberances 10 are formed in rows centrally of each arm 6 whereby a group thereof is provided upon the central portion 7 as shown in Figure 2. This arrangement of the protuberances 10 provides for a number thereof engaging the ground beneath the center of the tread, the advantage of which will be apparent.

The elements 4 are preferably disposed in the relation shown, i. e., at spaced intervals around the tire, so that full benefit may be obtained from the angular position of the arms 6. They are readily removable and replaceable, to provide for their proper grouping around tires of different diameters, and as the chains 5 are shiftable about the tire, the elements may creep about the tire while the vehicle is in motion, thus preventing localizing of the effect of the elements on the tire.

Although the invention has been described in detail and certain specific terms and language utilized herein, it is to be understood that changes and modifications may be resorted to without departing from the spirit of the invention or the scope of the claims appended hereto.

What I claim is:

1. A tire armor comprising, the combination of endless link chains adapted to be disposed upon opposite sides of the tire, and a plurality of elements of resilient material being constructed to span the tire, each element yieldable radially of the tire but being incapable of stretching transversely of the tire and being formed with arms arranged in cruciform relation and looped at their extremities to adapt them for attachment to said chains.

2. A tire armor comprising side chains and rubber cross links interconnecting said chains, the ends of said cross links being folded to form loops, fabric reinforcing members disposed within said links and extending throughout the length thereof including said folded end portions, and fastening means secured in said loops whereby said cross links may be attached to said side chains.

3. A tire armor comprising, the combination of adjustable link chains adapted to be disposed upon opposite sides of the tire, and a plurality of resilient elements adapted respectively to be attached between said chains each element embodying a plurality of arms radiating from a common center and having a fabric reinforcement substantially coextensive with the length thereof incorporated therein near one surface thereof.

4. A tire armor comprising, the combination of adjustable link chains adapted to be disposed upon opposite sides of the tire, and a plurality of resilient elements adapted respectively to be attached between said chains each element embodying a plurality of arms radiating from a common center and having a fabric reinforcement incorporated therein near one surface thereof the opposite surface of said arms being provided with non-skid protuberances.

5. A tire armor comprising, the combination of adjustable link chains adapted to be disposed upon opposite sides of the tire, a plurality of resilient elements adapted for attachment between said chains each element embodying a plurality of arms radiating from a common center said arms including a fabric strip coextensive in length therewith incorporated therein near one surface thereof, and hooks at the extremities of each arm for engaging the chains.

6. A tire armor comprising, the combination of link chains adapted to be disposed upon opposite sides of the tire, a plurality of resilient elements constructed to span the tire, said elements being formed of tough, flexible material capable of yielding under pressure but non-stretchable transversely of the tire, loops formed on said elements, and means carried by said loops for connecting the said elements to the chains.

7. A tire armor comprising, the combination of link chains adapted to be disposed upon opposite sides of the tire, a plurality of resilient elements constructed to span the tire, each of said elements comprising arms of tough, flexible material non-stretchable transversely of the tire and arranged in cruciform relation, a loop formed upon the end of each arm, and means carried by said loops for attaching the elements to the side chains.

8. A tire armor comprising, the combination of link chains adapted to be disposed upon opposite sides of the tire, a plurality of resilient elements constructed to span the tire, each of said elements comprising arms arranged in cruciform relation and provided with loops at the ends thereof, and hooks extending through the loops for attaching the elements to the side chains.

9. A tire armor comprising, the combination of link chains adapted to be disposed upon opposite sides of the tire, a plurality of resilient elements constructed to span the tire, each element embodying a plurality of arms radiating from a common center, a reinforcing element embedded in each of the arms, an integral loop formed on the end of each arm, and means carried by said loops for removably attaching the elements to said side chains.

10. A tire armor comprising, the combination of link chains adapted to be disposed on opposite sides of a tire, a plurality of resilient elements constructed to span the tire, each of said elements comprising a plurality of arms radiating from a common center, a fabric reinforcing element coextensive in length with each arm and embedded therein, loops upon the outer ends of the arms, and hooks encircled by said loops for attaching the said elements to the side chains.

11. A tire armor comprising side chains and cross-links, said cross-links each comprising a member of substantially X-shape composed of rubber having incorporated therein a non-extensible, flexible fabric, reinforcing member of substantially X-shape having the ends thereof folded to form loops, and means secured in said loops whereby said cross-links may be attached to said chains.

12. An anti-skid device comprising a strap member adapted to lie across the tread of a wheel, the said strap member being of flexible material with a tension device embedded therein and provided with openings adjacent to its ends for engagement with hook members.

13. An anti-skid device comprising a strap of flexible material having an eye portion adjacent to each end and inserts of relatively great tensile strength surrounding said eye portions.

14. An anti-skid device comprising a strap member adapted to lie across a tread of a wheel, the said strap member being provided with openings adjacent to its ends, and a tension device embedded in said member and surrounding said openings, the said openings being adapted to receive hook members for attachment to said chains.

15. The combination with a pair of side chains receivable on opposite sides of a tire, cross links of rubber extending at intervals across the side chains, tension elements embedded within the rubber, and hooks upon the ends of the cross links and received in links of the side chains, the tension elements being fastened at their ends on the hooks.

16. The combination with a pair of side chains receivable on opposite sides of a tire, cross links of rubber extending at intervals across the side chains, tension elements embedded within the rubber, and hooks upon the ends of the cross links and received in the links of the side chains, the extremities of the tension elements being formed as loops surrounding the hooks.

17. The combination with a pair of side chains receivable on opposite sides of a tire, cross links of rubber extending at intervals across the side chains, tension elements embedded within the rubber, and hooks upon the ends of the cross links and received in the links of the side chains, the extremities of the tension elements being formed as loops in which the hooks are pivoted.

18. The combination with a pair of side chains receivable on opposite sides of a tire, cross links of rubber extending at intervals across the side chains, tension elements embedded within the rubber, and hooks upon the ends of the cross links and received in the links of the side chains, the extremities of the tension elements being formed as loops in which the hooks are pivoted, the ends of said cross links being thickened about the hooks.

CARSON R. STEWART.